United States Patent [19]
Cirino et al.

[11] Patent Number: 5,683,212
[45] Date of Patent: Nov. 4, 1997

[54] CLAMPING ASSEMBLY FOR TAPERED HOLLOW SHANK OF TOOLING SYSTEM

[75] Inventors: John M. Cirino, Waite Hill; Richard P. Waiwood, Willoughby, both of Ohio

[73] Assignee: Master Tool Corporation, Grand River, Ohio

[21] Appl. No.: 596,670

[22] Filed: Feb. 5, 1996

[51] Int. Cl.$^6$ ...................................................... B23Q 3/12
[52] U.S. Cl. ........................... 409/234; 82/160; 279/2.11
[58] Field of Search ............................. 82/160; 279/2.01, 279/2.11, 2.12; 409/234, 232

[56] References Cited

U.S. PATENT DOCUMENTS

| | | | |
|---|---|---|---|
| 5,173,017 | 12/1992 | Oshnock et al. ........................ | 82/160 |
| 5,193,954 | 3/1993 | Hunt ......................................... | 82/160 |
| 5,492,441 | 2/1996 | Schuerfeld ............................... | 82/160 |

OTHER PUBLICATIONS

"How HSC is Shaping Machine Tool Design," *High Speed Machine*.
Guhring "The Modular Tooling System GM 300 to DIN 69 893" Brochure.
Guhring "The Modular Tooling System GM 300" Brochure.
Mapal "HSK–80" Literature.
DIN 69893.
"Little Booklet about the Hollow–Shank" by Kelch Prazision und Dynamik.
"Mapal Clamping Chuck KS" Brochure.
"Will The HSK Take Hold?" by Steven Plottner, *Cutting Tool Engineering*, Aug. 1992.
"Mapal KS Chuck for Hollow Shank Clamping" Brochure.
Keynote–Paper "High Speed Machining" by Herbert Schulz, Technical University of Darmstadt, Germany, and Tohimichi Moriwaki, Kobe University, Japan.

*Primary Examiner*—Steven C. Bishop
*Attorney, Agent, or Firm*—Fay, Sharpe, Beall, Fagan, Minnich & McKee

[57] ABSTRACT

A clamping assembly for a tapered hollow shank of a rotary cutting tool provides for ease of access to a tapered recess of the adaptor. The clamping assembly is designed for retention on the tool shank so that the adaptor recess remains open for cleaning purposes. The clamping assembly is actuated through a simple axial arrangement so that a throughbore can be defined through it for receipt of a reamer or to define a central coolant passage if desired.

6 Claims, 4 Drawing Sheets

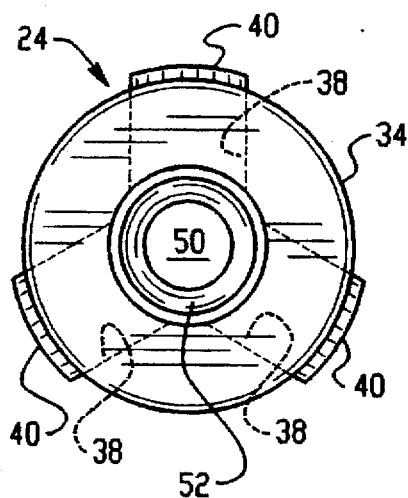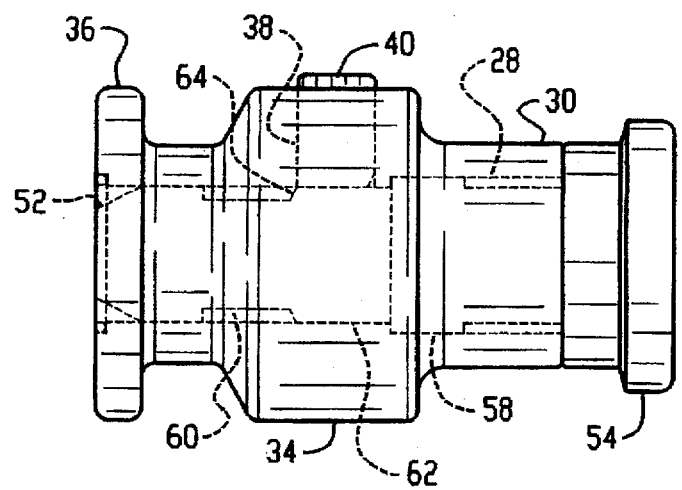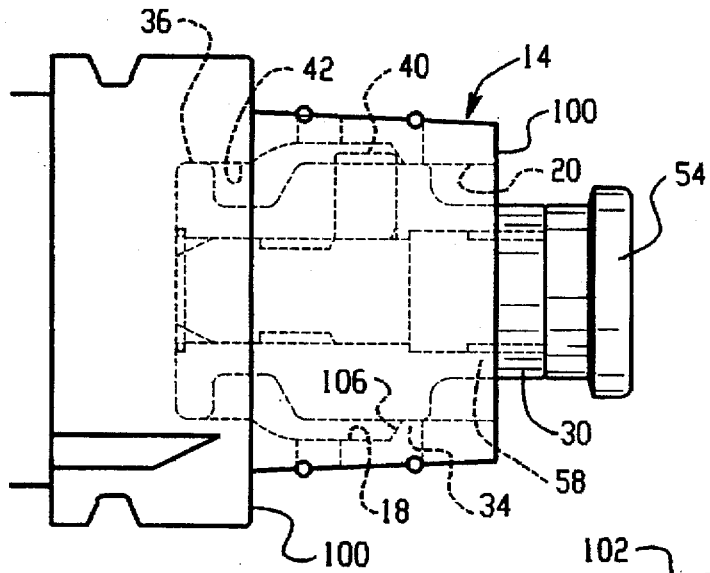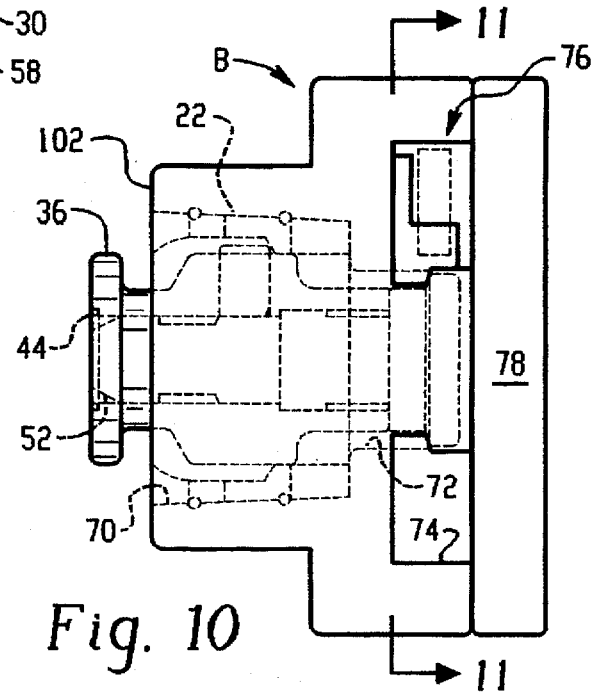
Fig. 8
Fig. 7
Fig. 9
Fig. 10

1

CLAMPING ASSEMBLY FOR TAPERED HOLLOW SHANK OF TOOLING SYSTEM

BACKGROUND OF THE INVENTION

This invention pertains to the art of tooling systems and more particularly to rotary cutting tools. The invention is particularly applicable to a clamping assembly that interfaces between a tapered hollow shank of a tool and an adaptor having a tapered recess that receives the tool shank and will be described with particular reference thereto. It will be appreciated, however, that the invention has broader applications and may be advantageously employed in related environments and applications.

A recent development in machine tools is directed to a new clamping assembly for mounting a rotary cutting tool to a spindle. The newly developed clamping assembly interface between the tool and the spindle was developed seeking improvements for various problems associated with a steep angle taper interface. Particularly, improvement was desired with regard to static and dynamic elasticity, tool change precision, limited working range, effectiveness of pull-back power throughout the entire spindle length, deformations at high speeds, high speed machining, and large weight considerations. As a result of that research and development, a proposal was submitted and became a recent DIN standard 69893 directed to a holder for tapered hollow shanks. The DIN standard is particularly directed to the dimensional and angular relationships of the hollow taper tool shank and associated adaptor recess but does not address the structure or operation in which the tool shank can be gripped or expanded from its interior to press the shank wall against the mating recess of the adaptor.

Accordingly, a number of tool manufacturers developed different clamping assemblies to complete the interface between the tool and the adaptor. Generally, each manufacturer secures the clamping assembly to the recess of the adaptor. At the other end of the clamping assembly, a series of projections or fingers are provided for selective radial outward movement to expand into the interior cavity of the hollow shank. Thus, the clamp fingers extend outward from the adaptor recess so that the tool shank can be positioned thereover. Once the shank is properly positioned in place, an actuating screw of the clamping assembly provides radial movement of the fingers. The screw in these known arrangements is radially oriented and therefore intersects with the longitudinal axis of rotation of the cutting tool. Rotation of the screw in one direction urges the fingers radially outward into engagement with the internal surface of the tool shank cavity.

Typically the fingers are equi-spaced within the shank cavity to provide a symmetrical clamping force. When tool changeover is required, the fingers are retracted by rotating the screw in the opposite direction, and the tool shank removed from the clamp assembly. The clamping assembly remains in place in the adaptor recess, defining a narrow annular access to the adaptor recess. A new tool shank is then inserted over the clamping assembly and the same process followed to tighten the tool in place.

It is of primary importance that the mating, tapered surfaces of the adaptor recess and the tool shank be kept clean. Any chips from the cutting operation that become lodged in the recess must be removed and the recess maintained clean. Known clamping arrangements limit accessibility to the tapered recess in the adaptor as described above since the clamping assembly is mounted and retained therein. Thus, it is deemed desirable to provide greater access to the adaptor recess so that it can be kept as clean as possible, minimizing the possibility that chips may be trapped therein, and maintaining concentricity and balance which are key goals of the hollow taper shank system.

Another drawback of known clamping assemblies is that the screw that actuates the fingers crosses the longitudinal or rotational axis of the tool. It is desired to maintain a continuous through opening along the rotational axis of the tool so that, for example, a reamer may be advanced axially through the adaptor, clamping assembly, and shank of the tool for selected cutting operations.

It is also desirable to have coolant supplied around the base of the tool. Prior clamping assemblies require tortuous, special flow paths for supplying coolant. Such special coolant paths add to the overall cost and complexity of the tool system. Thus, known tool systems are more limited than desired.

SUMMARY OF THE INVENTION

The present invention contemplates a new and improved interface in a tapered hollow shank tooling system that overcomes the above-identified problems and others, and provides a simple clamping assembly that achieves all of the goals of the hollow shank design.

According to the present invention, there is provided at least a pair of projections that may be moved radially for receipt in the hollow taper shank of a tool. An actuator selectively expands and retracts the projections through relative movement of first and second members of the actuator. The clamping assembly is thereby secured to the tool shank so that the tapered recess of the adaptor remains open for cleaning purposes.

According to another aspect of the invention, an axial through opening is provided with the new clamping assembly so that cooling fluid or additional applications of the tool can be easily accommodated.

According to another aspect of the invention, the clamping assembly includes a shoulder that is axially drawn into the adaptor recess so that mating radial faces of the tool shank and adaptor come into contact. Continued pulling forces on the shoulder assure intimate contact between the projections of the clamping assembly and the interior surface of the tool shank cavity so that the shank expands radially outward into intimate contact with the tapered recess of the adaptor.

A principal advantage of the invention is found in the ability to clean the recess of any chips by mounting the clamping assembly in the shank of the tool.

Another advantage of the invention resides in the alternative structure and method for clamping the hollow shank taper to the adaptor recess.

Still another advantage of the invention resides in the provision of an axial opening for different tooling operations and passage of coolant therethrough, if desired.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein

FIG. 7 is a view similar to FIG. 6 and showing the first and second members in an actuated position;

FIG. 8 is an end view taken generally from the left-hand side of FIG. 7;

FIG. 9 is a side elevational view of the clamping assembly as secured to the hollow taper shank of the tool;

FIG. 10 is a longitudinal cross section through an adaptor with the clamping assembly and portions of the hollow taper shank shown cooperating therewith;

DETAILED DESCRIPTION OF THE PREFERRED EMBODIMENT

Figure 1:
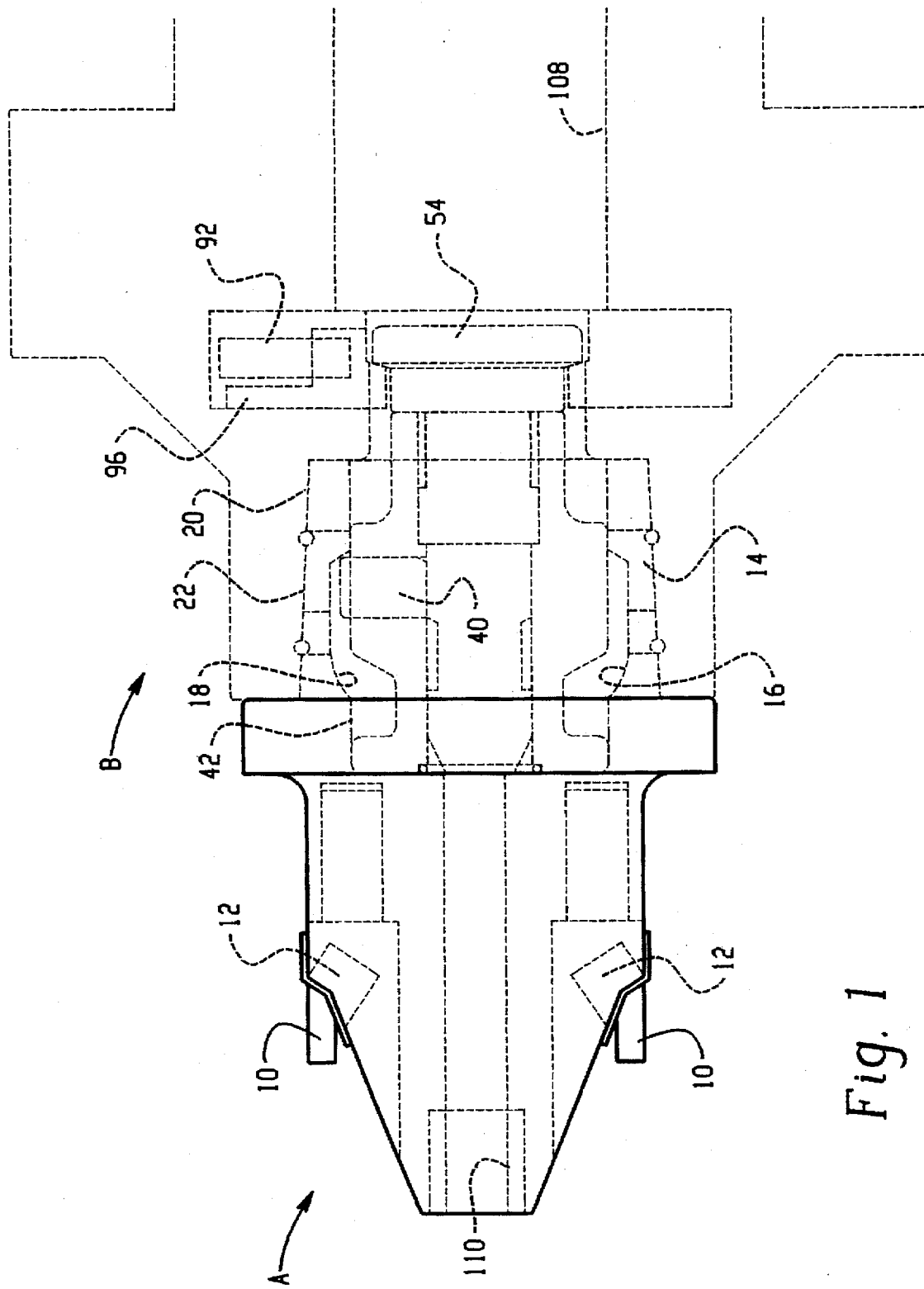
FIG. 1 is a view of the hollow tool shank, clamping assembly, and adaptor in accordance with the teachings of the subject invention.

Referring now to the drawings wherein the showings are for the purposes of illustrating the preferred embodiment of the invention only and not for purposes of limiting same, the FIGURES show a rotary cutting tool A that is secured to a spindle (not shown). As described above, the recently enacted DIN standard covers a tapered hollow shank on the cutting tool that is received in an adaptor B. Various manufacturers have developed different clamping assemblies to interface the tool shank to the adaptor. Described herein is a preferred clamping assembly C that secures the hollow taper shank of a cutting tool to an adaptor that is secured to a spindle.

More specifically, and referring to FIG. 1, the rotary cutting tool a includes one or more cutting blades 10 mounted at a predetermined angle and diameter for a particular cutting operation. For example, three removable inserts 12 are used in a preferred embodiment so that once a blade 10 becomes worn, the inserts may be easily replaced and the blade mounted therein is disposed at the proper angle and orientation.

Disposed at an opposite end of the cutting tool is a hollow taper shank 14 that is the subject of DIN standard 69893. An interior cavity 16 of the shank has an enlarged diameter portion 18 and a reduced diameter region 20. Moreover, the walls of the shank are configured to have limited flexibility for reasons which will become more apparent below. The outer surface of the tapered shank provides for a mating fit with a similarly tapered recess in an adaptor.

The subject new clamping assembly C is particularly intended to overcome a cleaning problem associated with prior art arrangements. That is, the adaptor B has a tapered recess 22 for receiving the hollow shank of the tool. The DIN standard does not address the particular clamping assembly used to interconnect the hollow taper shank to the tapered recess. As described above, prior art structures fix the clamping assembly to the adaptor, or spindle, with a portion of the clamping assembly extending axially outward for receipt in the cavity 16 of the tool shank. Although these arrangements have met with success, access to the tapered recess 22 of the adaptor is limited. Chips can collect in the recess and if not removed, prevent a precise, mating fit between the hollow shank of the tool and the adaptor recess which adversely impacts on operation of the tool, e.g., concentricity, balance, etc.

Figure 3:
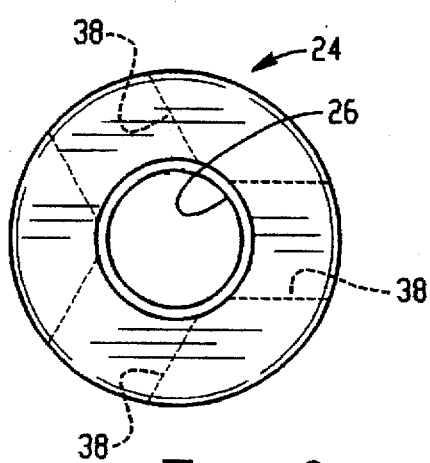
FIG. 3 is an end view taken generally from the left-hand side of FIG. 2.
Figure 2:
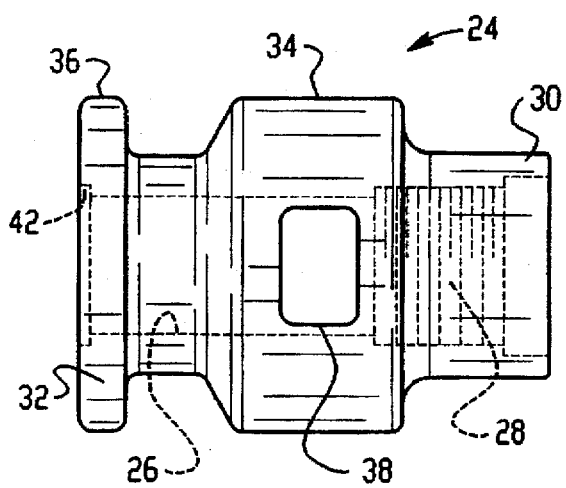
FIG. 2 is an elevational view of a first member of the clamping assembly.

The new clamping assembly C of the subject invention is comprised of three major components. A first member or sleeve 24 is individually shown in FIGS. 2 and 3. It has a longitudinal bore or opening 26 that is threaded at 28, extending inwardly from a first end 30, and preferably terminates before reaching second end 32. A pair of spaced apart lands 34, 36 are provided on the periphery of the first member. The lands are generally the same diameter and adapted for receipt in the small diameter regions of the cavity 16. The first land communicates with the bore through a series of sidewall or radially extending passages 38. In the preferred embodiment, there are three radial passages. Each passage is adapted to receive a projection or button 40 that is dimensioned for sliding receipt in a radial direction, so that in a deactuated or unclamped position, the projections do not extend beyond the outer surface of the land 34. In an actuated or clamped position, the projections 40 are urged outwardly through their respective passages 38 to a predetermined height above the external surface of the land. The particular details of the extension and retraction of the buttons within the radial passages will be described in further detail below. The second land 36 is adapted for receipt in close fit relation within a recess 42 in the hollow shank (FIG. 9).

The second end of the sleeve 24 includes a counterbore 42 that extends axially inward a limited dimension. It is adapted to receive a seal member such as an O-ring 44 for sealing the first end of the sleeve member with the second member of the actuating assembly and the internal cavity of the tapered shank.

Figure 4:
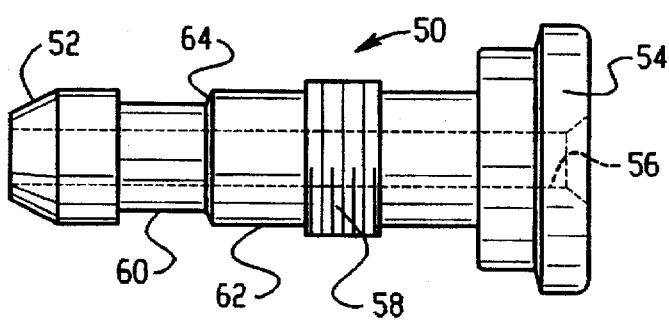
FIG. 4 is an elevational view of a second member of the clamping assembly.
Figure 5:
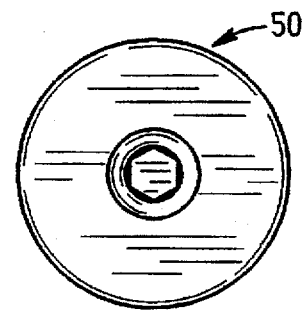
FIG. 5 is an end view taken generally from the right-hand side of FIG. 4.

A second member 50 of the clamping actuating assembly (FIGS. 4 and 5) has a tapered nose 52 at one end and an enlarged diameter shoulder 54 at the other end. A smooth walled bore 56 is concentric with the longitudinal axis of the actuating member for reasons which will become more apparent below. The actuating member also includes an external threaded region 58. The threaded region has the same thread size and pitch as the internal thread 28 of the sleeve so that the actuating member can be selectively advanced into and retracted from the opening 26 of the sleeve.

Figure 6:
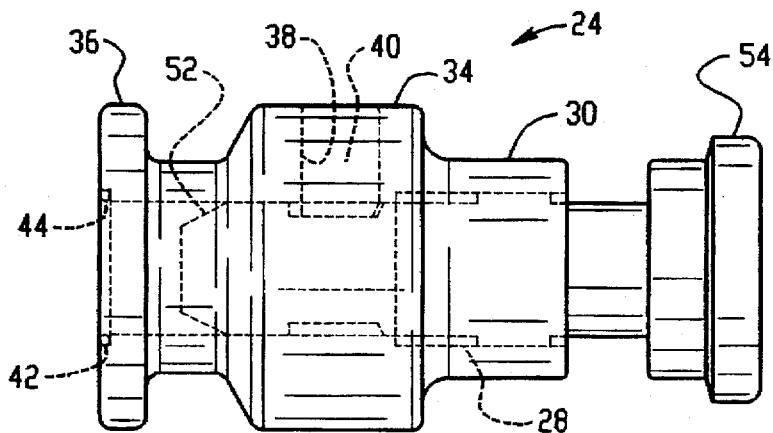
FIG. 6 is side elevational view of the clamping assembly in a non-actuated position.

Moreover, a pair of lands 60, 62 are interposed between the tapered nose and threaded region 58 of the actuating member. Specifically, the first land 60 is of a reduced diameter. When the first land is aligned beneath the passages 38 of the sleeve, the individual projections 40, urged inwardly by a spring or other biasing member (not shown) are seated on the reduced diameter land 60. Stated another way, the external or radially outer surfaces of the projections do not extend outwardly beyond the outer surface of the land 34 of the sleeve. By rotating the second member 50, it is axially advanced further into the sleeve. This positions the second or larger diameter land 62 beneath the radial passages 38 of the sleeve. To ease the transition between the first and second lands 60, 62, a tapered shoulder 64 interconnects the lands and urges the projections outwardly as the actuating second member is advanced further inwardly into the sleeve of the clamping assembly. Once the actuating second member has been fully inserted into the sleeve as shown in FIG. 7, the buttons 40 project radially outward beyond the external surface of the land 34. This represents the actuated or clamped position of the assembly (FIGS. 7 and 8). As is appreciated, the end 32 of the sleeve is advanced inwardly into the cavity 16 of the tapered shank. This axial insertion can only occur when the actuating assembly is disposed in a non-actuated or unclamped position relative to the sleeve as shown in FIG. 6 since the buttons are then retracted within the openings 38. Once the sleeve bottoms out within the recess 42 of the tapered shank, the actuating second member is rotated to the position shown in FIG. 7 where the projections extend radially outward from the sleeve. This captures the clamping assembly within the hollow tapered shank 14 of the cutting tool (FIG. 9) since the buttons have a greater diameter than reduced diameter region 20 of the tool shank. As long as the clamping assembly maintains its position as shown in FIG. 7, the projections extend radially outward a distance greater than the reduced diameter 20 of the cavity and prevent removal of the clamping assembly from the hollow shank of the cutting tool. Moreover, the bore 56 provides a continuous passage through the clamping assembly to a central opening through the tool.

Turning next to FIGS. 10–14, the interconnection of the clamping assembly carried by the tool with a tapered recess of an adaptor B will be described. As best shown in FIG. 10, some structural details of the tool and the shank have been removed for ease of illustration. However, and as will be understood from the above description, the clamping assembly remains mounted within the hollow shank of the tool as long as the clamping assembly is maintained in its clamped or actuated position shown in FIGS. 7 and 8.

Figure 11:
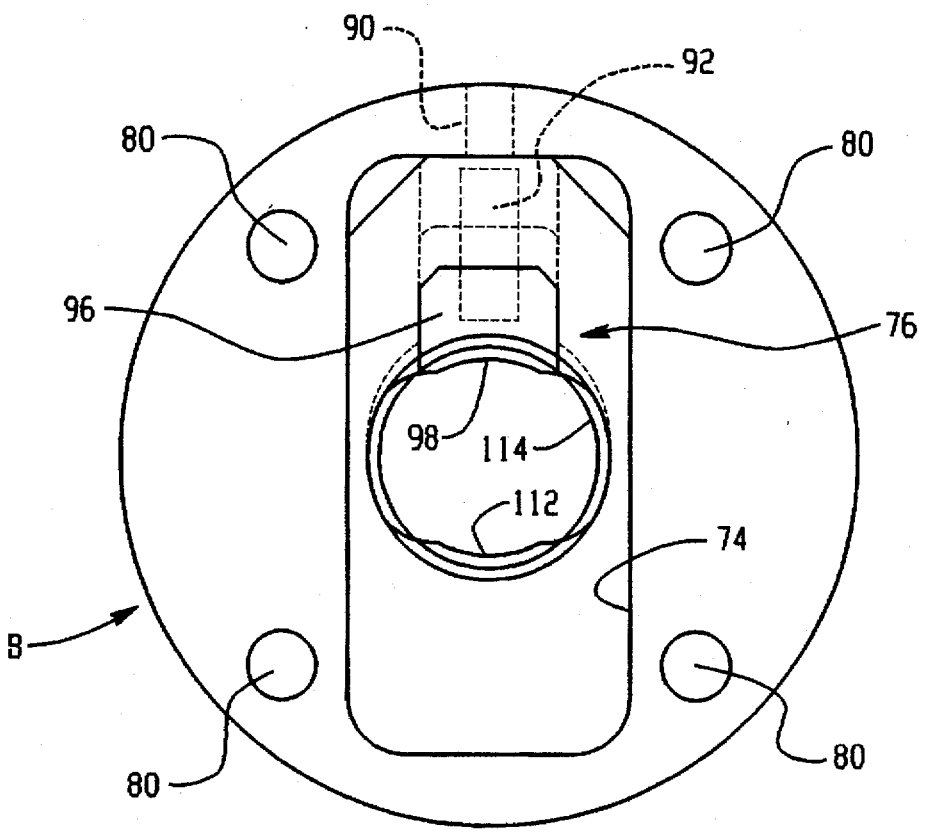
FIG. 11 is an end view taken generally along the lines 11—11 of FIG. 10.
Figures 12, 13, 14:
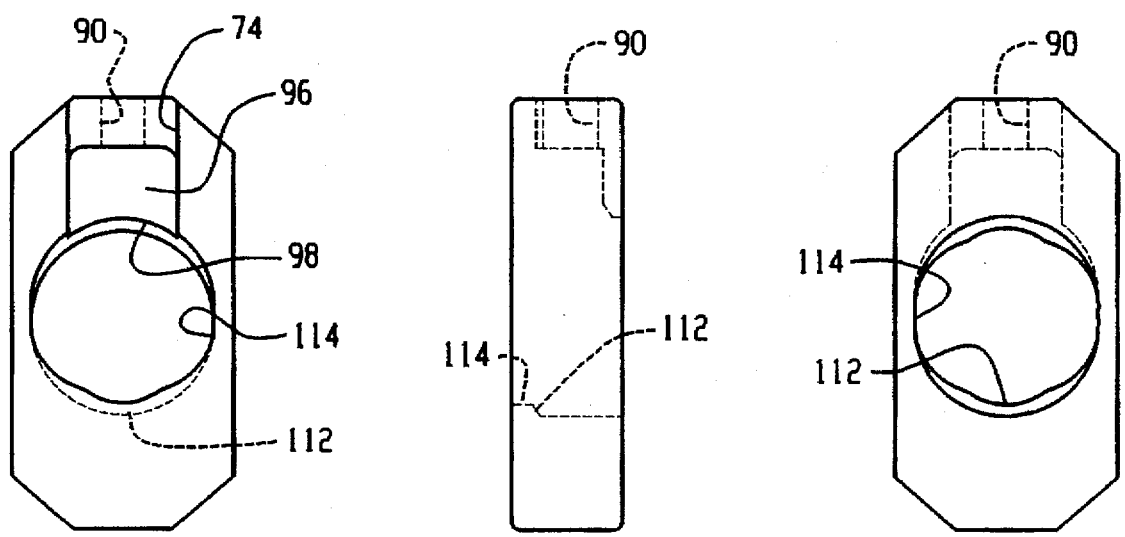
FIG. 12 is an elevational view of a draw member received in the adaptor.
FIG. 13 is an end view taken from the right-hand side of FIG. 12.
FIG. 14 is an end view taken generally from the left-hand side of FIG. 12.

The external surface of the shank is closely received within tapered recess 70 of the adaptor. A reduced diameter passage 72 is provided at the base of the recess and is adapted to receive the shoulder 54 of the clamping assembly therethrough. An enlarged cavity 74 is disposed on the other side of the passage 72 from the tapered recess in the adaptor. The enlarged cavity receives a slide assembly 76 illustrated in FIGS. 12–14 and as shown in its mounted position in the passage 74 in FIG. 11. Preferably, an end plate 78 is received on a rear face of the adaptor and mounted thereto through conventional mounting means represented by openings 80 (FIG. 11). The adaptor, in turn, is secured to a spindle in a well known manner or forms an integral part of the spindle.

communicating radially through a sidewall of the adaptor is a threaded passage 90 of the slide assembly that receives a dual threaded screw 92. A first thread portion 94 of the screw is received in slide member 96 so that rotation of the screw by a tool, such as an Allen wrench, through the passage 90 advances and retracts the slide member 96 in the passage 74. A tapered shoulder 98 in the slide member forms a wedge face that engages the internal face of shoulder 54 of the clamping assembly. This pulls the clamping assembly, and likewise the cutting tool connected thereto, axially inward into the tapered recess 70 of the adaptor. This pull back force assures that the rear face of the tool 100 engages tightly against face 102 of the adaptor. Moreover, this drawing force pulls tightly on the clamping assembly within the cavity of the tool shank, urging the walls of the shank radially outward into tight, mating engagement with the tapered recess of the adaptor. This outward deformation of the tool shank occurs since the projections engage tapered shoulder 106 (FIG. 9). The final assembled relation is best shown in FIG. 1 where the rear face 100 of the tool is in tight engagement with the adaptor face 102. Likewise, the outer faces of the projecting buttons 40 clamp tightly against the internal face of the cavity 16 of the tapered shank. This allows the limited flexibility of the tapered shank to be urged radially outward into precise mating engagement with the tapered recess of the adaptor.

Accordingly, the subject invention offers many features not found in the prior art. For example, the throughbore 56 of the clamping assembly provides communication between passage 108 shown in the adaptor and a passage 110 shown in the cutting tool (FIG. 1). A reamer or other tool can then be axially inserted through these communicating openings so that the cutting tool has enhanced features with this tapered hollow shank mounting arrangement. Additionally, these passages provide an easy passage for communication of cooling fluid directly to the cutting area and appropriate O-rings provided in the clamping assembly at the nose portion and between the shoulder 54 and threads 58 of the actuator member provide a sealed path therethrough.

Additionally, and as best illustrated in FIG. 9, the clamping assembly remains with the tool. This means that the tapered recess of the adaptor is left completely open or void of any portions of the clamping assembly until the tool is inserted in place. Thus, in a quick change operation, the tool and clamping assembly are removed as a unit from the adaptor. This is contrasted with prior art arrangements where the tool shank, when removed, leaves the clamping assembly in place within the adaptor recess. As noted above, the prior art arrangement makes it difficult to clean the tapered recess of the adaptor because of the narrow annular opening between the clamping assembly and the adaptor. With the subject invention, however, the adaptor recess is completely open so that an operator can easily access the recess and be sure it is free of chips or the like.

Still another feature offered by the clamping assembly remaining with the tool is that the prior art arrangements necessarily begin expansion of the hollow shank prior to completing the pull down and mating between the faces 100, 102 of the adaptor and tool. With the subject invention, however, the slide member engages the shoulder and pulls the clamping assembly and tool axially inward into the recess. A tapered shoulder 112 cooperates with shoulder 98 on the slide member to pull the shoulder 54 of the clamping assembly toward rear plate 78 as the slide member is advanced by screw 92. This assures that the faces 100, 102 are first brought into tight, abutting relation. Continued axial advancement then expands the wall of the tool shank outwardly into a tight, precise fit between the shank outer surface and the recess of the adaptor. Rotating the screw 92 in the opposite direction retracts the slide member 96 and allows the shoulder 54 of the clamping assembly to be removed from opening 114. A new tool and clamping assembly are then provided and the tool secured in the same manner as described above.

The invention has been described with reference to the preferred embodiment. Obviously, modifications and alterations will occur to others upon a reading and understanding of this specification. For example, variants on the clamping assembly can be used to the particular structure described herein. However, the feature of maintaining a clamping assembly with the tool to allow free access to the adaptor recess is believed to be an important part of the invention. Likewise, the additional benefit of a continuous through passage offers a structural arrangement and function in the hollow taper shank not even remotely addressed by prior art arrangements. Accordingly, this invention is intended to include all such modifications and alterations insofar as they come within the scope of the appended claims or the equivalents thereof.

Having thus described the invention, it is claimed:

1. A clamping assembly interposed between a hollow shank taper of a tool that rotates about an axis and an adaptor having a tapered recess that receives the tapered tool shank, the clamping assembly comprising:

at least a pair of radially expandable projections adapted for receipt in an associated hollow shank of a tool;

an actuator for selectively expanding and retracting the projections, the actuator including first and second members that move axially relative to one another so that in a first position of the members the projections are retracted, and in a second position of the members the projections are expanded to secure the clamping assembly to the tool shank whereby the tapered recess of the adaptor remains open for cleaning purposes; and a locking mechanism disposed in the adaptor for axially advancing the tapered tool shank into the tapered recess of the adaptor.

2. The clamping assembly as defined in claim 1 wherein the first and second members of the actuator are threadedly interconnected.

3. The clamping assembly as defined in claim 2 wherein the projections are disposed in the extended, second position upon full threaded engagement between the first and second members of the actuator.

4. The clamping assembly as defined in claim 1 wherein the actuator includes a shoulder adapted for receipt in the recess of the associated adaptor.

5. The clamping assembly as defined in claim 1 wherein the locking mechanism radially expands the tapered tool shank after the shank has bottomed out in the adaptor recess.

6. The clamping assembly as defined in claim 1 wherein the locking mechanism includes a slide member that captures the shoulder of the clamping assembly and axially advances the shoulder further into the adaptor.

* * * * *